United States Patent
Kim et al.

(10) Patent No.: US 7,289,821 B2
(45) Date of Patent: Oct. 30, 2007

(54) WIRELESS COMMUNICATION SYSTEM AND METHOD

(75) Inventors: Yong-suk Kim, Daejeon (KR); Won-yong Yoon, Yongin (KR); Tae-jin Lee, Suwon (KR); Doo-seop Eom, Seoul (KR); Yang-ick Joo, Seoul (KR); Kyun-hyon Tcha, Seoul (KR); Jong-soo Oh, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 803 days.

(21) Appl. No.: 10/685,563

(22) Filed: Oct. 16, 2003

(65) Prior Publication Data

US 2004/0166883 A1   Aug. 26, 2004

(30) Foreign Application Priority Data

Feb. 21, 2003   (KR) .................... 10-2003-0011125

(51) Int. Cl.
*H04B 7/00* (2006.01)
*H04Q 7/20* (2006.01)

(52) U.S. Cl. .................. 455/512; 455/450; 455/561; 455/435.3; 455/513; 455/41.2; 370/412; 370/449; 370/230; 370/390; 370/238

(58) Field of Classification Search .............. 370/346, 370/412, 449, 248, 229, 252, 230–238, 253, 370/315, 328, 329, 349, 389, 390, 392, 445, 370/487, 414; 455/435.3, 450, 561, 513, 455/41.2
See application file for complete search history.

(56) References Cited

U.S. PATENT DOCUMENTS 6,657,987 B1 * 12/2003 Kumar et al. ............... 370/346
6,920,119 B2 *  7/2005 Rinchiuso .................. 370/329

(Continued)

FOREIGN PATENT DOCUMENTS

KR   10-2004-0039900 A   5/2004

OTHER PUBLICATIONS

Jong Soo Oh et al, "Differentiated fairness guaranteed scheduling policies for Bluetooth", IEEE, pp. 923-926,2002.*

(Continued)

*Primary Examiner*—Matthew Anderson
*Assistant Examiner*—Sujatha Sharma
(74) *Attorney, Agent, or Firm*—Sughrue Mion Pllc.

(57) ABSTRACT

A wireless communication system includes a queue status detection unit for detecting the amount of unit data being used for communication between a plurality of external devices, and deciding a class parameter T of one of the external devices; a counter for counting the number of giving-away times of the external device based on the giving-away of communication opportunities to communicate with the plurality of external devices, and deciding a delay parameter D of an external device; a communication priority decision unit for calculating priority values P of an external device by using a class parameter and a delay parameter, and determining an external device having a priority out of the plurality of external devices based on the priority values; and a communication initiation unit for initiating data communications with the determined external device having the priority. Accordingly, a communication method considering both throughput and fairness can be obtained.

16 Claims, 8 Drawing Sheets

U.S. PATENT DOCUMENTS 7,075,890 B2 * 7/2006 Ozer et al. .................. 370/230
2004/0085981 A1 * 5/2004 Lee et al. .................. 370/412

OTHER PUBLICATIONS

Jyothsna Kalvala et al, "Differentiated priority scheduling and adaptive segmentation for Bluetooth piconets", IEEE Proceedings of the 39th Hawaiian International conference on system sciences, 2006.*

M. Kalia et al,"MAC scheduling and SAR policies for Bluetooth: A master driven TDD Pico-cellular wireless system",IEEE, pp. 384-388 (1999).*

M.Kalia et al, "Data scheduling and SAR for bluetooth MAC", Vehicular technology conference proceedings, 2000-spring, Tokyo, vol. 2, pp. 716-720.*

Yang Ick Joo eta l, "An efficient and QoS aware scheduling policy for bluetooth", VTC 2002-Fall, IEEE, vol. 4, pp. 2445-2448.*

Jong Soo Oh et al, "Differentiated fairness guaranteed scheduling policies for Bluetooth", IEEE, pp. 923-926,2002.*

Jyothsna Kalvala et al, "Differentiated priority scheduling and adaptive segmentation for Bluetooth piconets", IEEE Proceedings of the 39th Hawaiian International conference on system sciences. 2006.*

Mi. Kalia et al,"MAC scheduling and SAR policies for Bluetooth: A master driven TDD Pico-cellular wireless system",IEEE, pp. 384-388, 1999.*

* cited by examiner

WIRELESS COMMUNICATION SYSTEM AND METHOD

BACKGROUND OF THE INVENTION

This application claims the priority of Korean Patent Application No. 2003-11125, filed on Feb. 21, 2003, in the Korean Intellectual Property Office, the disclosure of which is incorporated herein in its entirety by reference.

1. Field of the Invention

The present invention relates to a short-range wireless communication system and method, and more particularly to wireless communication system and method capable of securing both a high throughput and fairness among wireless communication devices when one wireless communication device receives and transmits data from and to a plurality of wireless communication devices.

2. Description of the Prior Art

The Bluetooth system is generally used for short-range wireless communication systems. The Bluetooth refers to a code for a short-range wireless data communication technology over all the electric communications, networking, computing, and consumables sectors. The Bluetooth technology replaces a plurality of cable connections necessary among devices, using one wireless connection in a short range.

A short-range wireless communication system such as the Bluetooth system uses a time division duplex (TDD) to perform bi-directional communications between the master and slaves by one hopping slot (625 $\mu s=\frac{1}{1600}$ seconds) basically.

The round-robin polling scheme and the queue state dependent packet scheduling algorithm are used for the TDD polling schemes employed in a conventional short-range wireless communication system.

FIG. 1 is a view for showing a round-robin scheme, and the following descriptions are made for a case when data is sent in the round-robin manner between one master and three slaves. The round-robin scheduling algorithm dictates that, when the master polls a slave, only the polled slave can send data to the master. That is, the master can send data at even-numbered slots, and a slave can send data at adjacent odd-numbered slots only when the slave is polled by the master. The other slaves are prohibited from sending data at the slot. In this case, the master sequentially polls slave 1, slave 2, and slave 3, and each master-slave pair can receive and send data at a rate corresponding to one third of the entire transmission rate by the master polling.

The round-robin scheme as described above allocates the same transmission rate to respective master-slave pairs. However, an amount of data to be sent compared to other services becomes less or more according to the kinds of application services. In this case, the transmission efficiency becomes lowered when the same transmission rate is allocated to all the kinds of services. That is, it is possible to allocate a transmission rate lower than a transmission rate necessary for a service for which more data should be sent, or, to the contrary, to allocate a transmission rate higher than a transmission rate necessary for a service with less data. Therefore, there occurs a problem of wasting slots due to POLL-NULL packets when there is no data to be sent.

As an alternative to the round robin scheme, there is a queue status dependent scheduling algorithm that categorizes classes depending upon link utilization degrees of master-slave pairs, assigns priorities to the classes, and polls the classes based on the priorities.

FIG. 2 is a view for showing a queue status dependent scheduling algorithm. In FIG. 2, the queue status dependent packet scheduling method exchanges queue status information of master/slave pairs by using reserved bits of the packet payload header, and categorizes classes depending upon link utilization information of respective master/slave pairs based on the exchanges. For example, in FIG. 2 as in the master/slave 1 pair, when the number of packets the master is to send to slave 1 is 3 and the number of packets the slave 1 is to send to the master is 1, the master/slave 1 pair is categorized into class 100%. In the master/slave 2 pair, the number of packets to be received and sent is 3, thus the master/slave 2 pair is categorized into class 75%, and in the master/slave pair 3, when the number of packets to be received and sent is 1, the master/slave pair 3 is categorized into class 50%.

Priorities are assigned to the respective master/slave pairs based on the classes determined in such a manner. Accordingly, in the order of the master/slave 1 pair, master/slave 2 pair, and master/slave 3 pair, each pair has an opportunity.

The number of times of giving away or taking over data transmission opportunities based on the priorities is reflected by additional counters, and a counter value difference between the master/slave pair taking over service opportunities a maximum number of times and the master/slave pair giving away service opportunities a maximum number of times is restrained to a specified value K, to thereby secure the fairness.

However, the queue status dependent packet scheduling method has an advantage of maintaining an appropriate fairness for service opportunities among respective master/slave pairs while maximizing throughput through the priorities, but also has a problem in that it compares counter values between a pair having the most frequent service opportunities and a pair having the least frequent service opportunities and, if a difference becomes large, restrains any further effective scheduling through priorities (that is, it operates in the round-robin manner once reaching a K value), and has inconstant performances after reaching the K value depending upon whether data traffic characteristics are static or dynamic.

SUMMARY OF THE INVENTION

The present invention has been devised to solve the above problem, so it is an object of the present invention to provide a wireless communication system and method capable of improving wireless communication transmission efficiency by changing communication priorities among communication devices based on a queue status of data to be received and sent when one wireless communication device receives and sends data from and to a plurality of external devices.

In order to achieve the above object, a wireless communication system, according to the present invention, includes a queue status detection unit for detecting the number of unit data used for communications between a plurality of external devices, and deciding a class parameter T of an external device; a counter for counting the number of giving-away times of the external device based on the giving-away of communication opportunities to communicate with the plurality of external devices, and deciding a delay parameter D of the external device; a communication priority decision unit for calculating priority values P related to the external device by using the class parameter and the delay parameter, and deciding an external device having the highest priority out of the plurality of external devices based on the priority values; and a communication initiation unit for initiating data communications with the decided external device having the priority.

The communication priority decision unit calculates the priority values based on the following Formula:

$$P=\alpha T+(1-\alpha)D$$

where α denotes a weighted value, T is a class parameter, and D is a delay parameter.

The wireless communication system further comprises a comparison unit for comparing a maximum priority value with a priority value of a first external device and the priority values of a plurality of external devices, wherein, when the priority value of the first external device is smaller than the maximum priority value, the communication priority decision unit decides that a second external device has the maximum priority value, and has an opportunity for transmission, and the communication initiation unit initiates communication with the second external device.

When initiating communications with the second external device, the queue status detection unit detects the amount of data communicating with the second external device, and changes the class parameter of the second external device, and the counter decreases the number of giving-away times of the second external device and increases the number of giving-away times of the first external device so as to change delay parameters of the first and second external devices.

Accordingly, the communication priority decision unit updates the priority values of the first and second external devices by using the changed class parameter and delay parameters.

If a priority value of the first external device equals the maximum priority value, the communication priority decision unit determines that the first external device is an external device that has an opportunity for transmission, and the communication initiation unit initiates communications with the first external device.

When initiating communications with the first external device, the queue status detection unit detects the amount of data communicating with the first external device, and changes the class parameter of the first external device, and the communication priority decision unit updates the priority value of the first external device by using the changed class parameter.

In the meantime, a wireless communication method comprises steps of detecting the amount of unit data being transmitted to/from the plurality of external devices by an external device, and determining a class parameter of the external device; counting the number of giving-away times of the external device based on the giving-away of communication opportunities to communicate with the plurality of external devices, and determining a delay parameter of the external device; calculating priority values P of the external device by using the class parameter and the delay parameter, and determining an external device having a priority out of the plural external device based on the priority values; and initiating data communications with the determined external device having the highest priority.

The wireless communication method further comprises a comparison step for comparing a maximum priority value with a priority value of a first external device and the priority values of the plurality of external devices, wherein, when the priority value of the first external device is smaller than the maximum priority value, the external device priority decision step determines that a second external device has the maximum priority value, and has an opportunity for transmission, and the communication initiation step initiates communication with the second external device.

When initiating communications with the second external device, the class parameter decision step detects the amount of data being transmitted to and from the second external device, and changes the class parameter of the second external device, and the delay parameter decision step decreases the number of giving-away times of the second external device and increases the number of giving-away times of the first external device so as to change delay parameters of the first and second external devices.

The external device priority decision step updates the priority values of the first and second external devices by using the changed class parameter and delay parameters.

If a priority value of the first external device is equal to the maximum priority value, the external device priority decision step determines that the first external device is an external device that has an opportunity for transmission, and the communication initiation step initiates communications with the first external device.

When initiating communications with the first external device, the class parameter decision step detects the amount of data being transmitted to and from the first external device, and changes the class parameter of the first external device, and the external device priority decision step updates the priority value of the first external device by using the changed class parameter.

Accordingly, the present invention has an effect of preventing unnecessary transmission rate allocations that occur by uniformly allocating the same transmission rate to every master/slave pair as in the round-robin manner, and overcomes the complexity of a scheme using performance restraints and the fairness security related to a specific master/slave pair, in the queue status dependent packet scheduling method.

BRIEF DESCRIPTION OF THE DRAWINGS

The invention will be described in detail with reference to the following drawings in which like reference numerals refer to like elements, and wherein.

DETAILED DESCRIPTION OF THE PREFERRED EMBODIMENTS

Hereinafter, the present invention will be described in detail with reference to the accompanying drawings.

Figure 1:
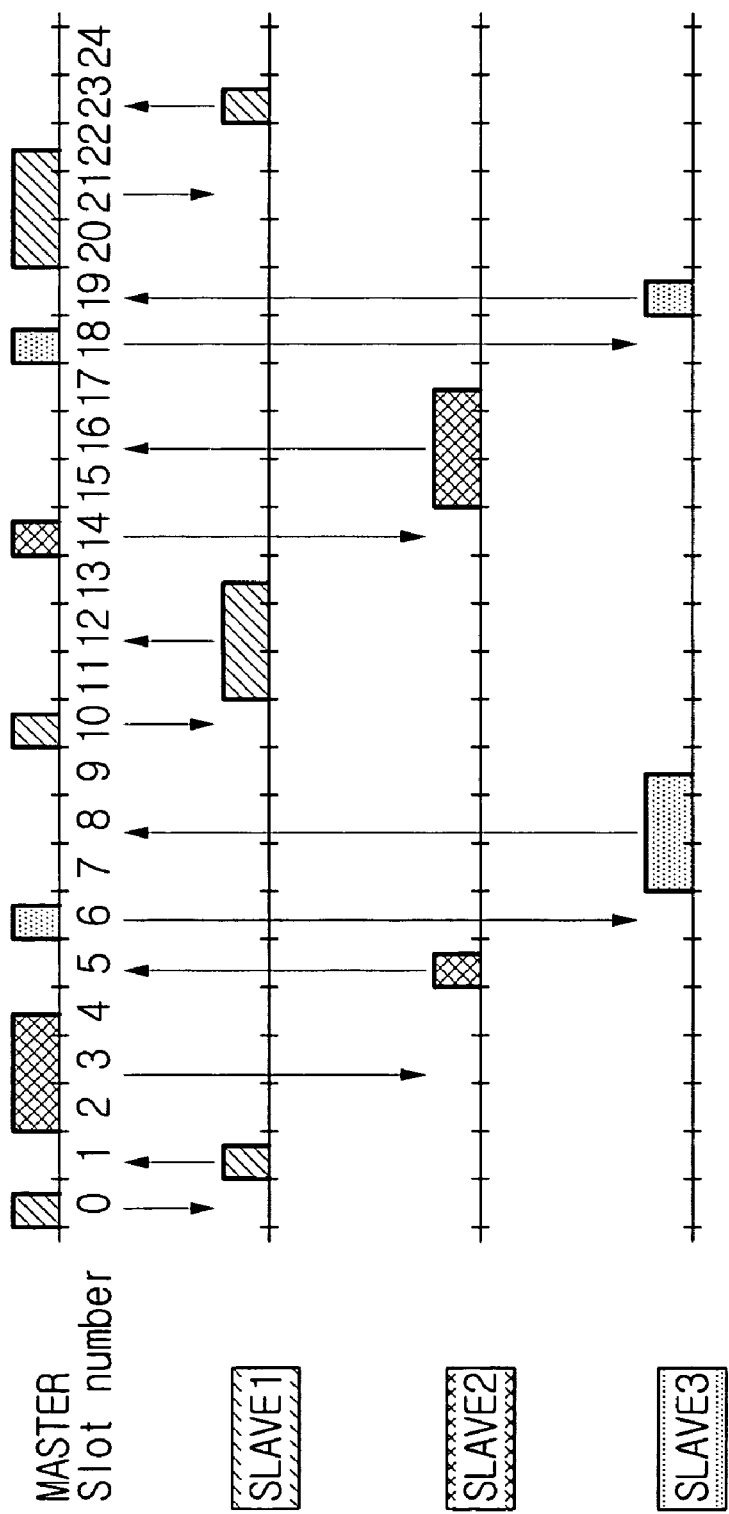
FIG. 1 is a view for conceptually showing a general round-robin scheme.
Figure 2:
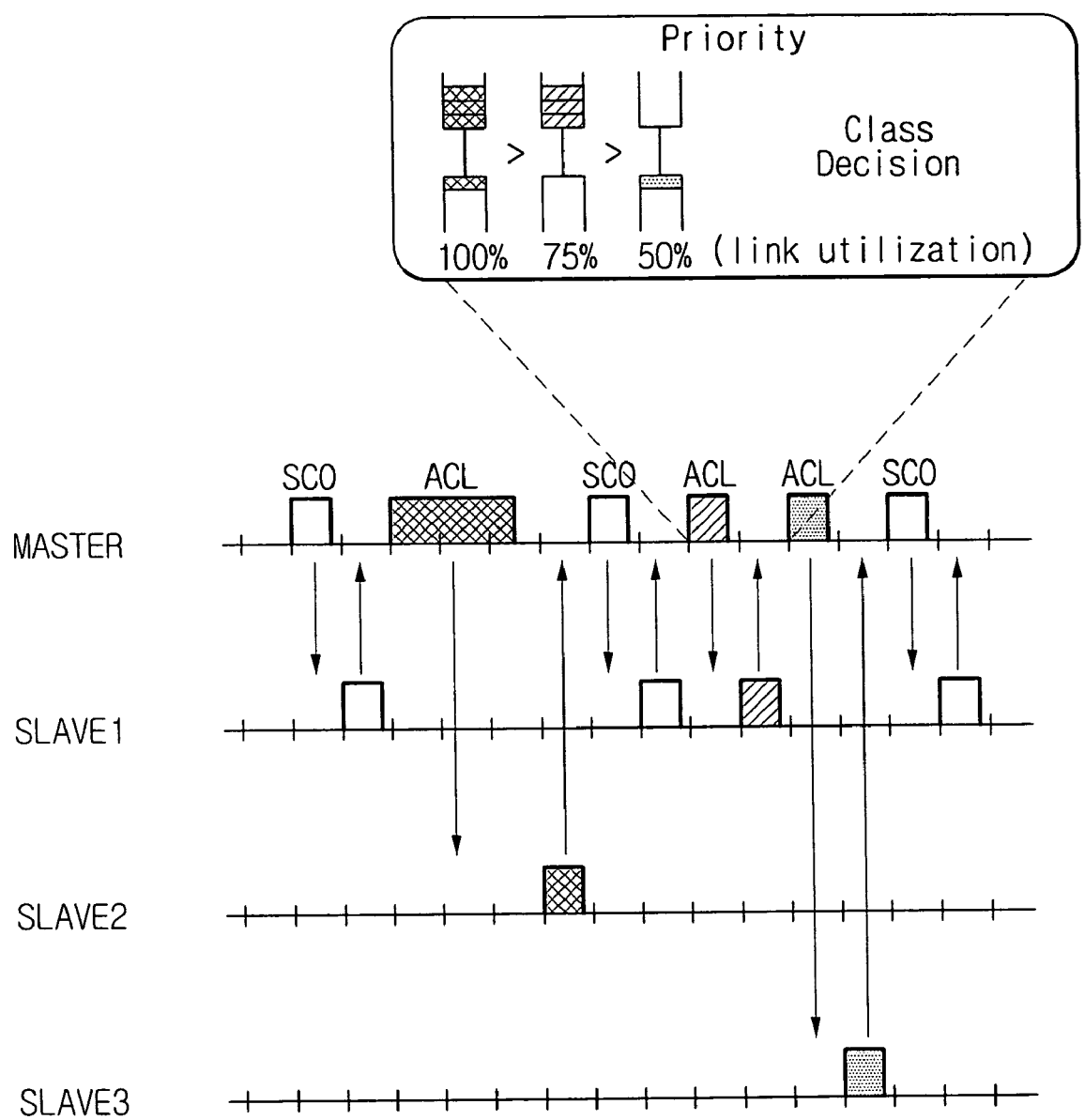
FIG. 2 is a view for conceptually showing a queue status dependent packet scheduling scheme.
Figure 3:
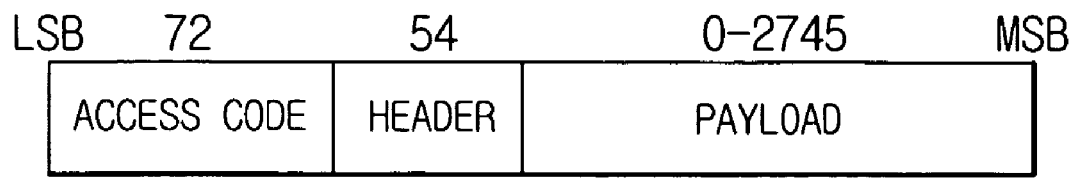
FIG. 3 is a view for showing a standard packet format.

FIG. 3 is a view for showing a standard packet format. Data is received and sent by packet among he master and slaves in a piconet. In FIG. 3, a packet consists of three objects, that is, an access code, a header, and a payload, in general. Packets of the other formats may have an access code only, or an access code and a header.

The packet begins with the access code. If a header comes after the access code, the access code has a 72-bit length, and, if a header does not come after the access code, the access code has a 68-bit length. The access code identifies all packets being exchanged through channels in a piconet.

The header includes link controller (LC) information, and consists of six fields, that is, AM_ADDR (Active Member Address), TYPE, FLOW, ARQN (Automatic Repeat request Number), SEQN (Sequential Numbering scheme), and HEC (Header-Error-Check).

The AM_ADDR identifies active members taking part in a piconet when a plurality of slaves are connected to one master. The TYPE determines which of a Synchronous Connection Oriented Link (SCO) packet or an Asynchronous Connection Link (ACL) packet is sent. Further, the TYPE may determine whether packets are received in the SCO packet type or the ACL packet type. The FLOW is used to control packet flows for the ACL link. If successfully received, an acknowledge (ACK, ARQN=1) returns, and, if not, a NAK (NRQN=0) returns. The SEQN provides a consecutive numbering method for data packet streams. The HEC checks the completeness of the header.

The payload is divided into a synchronous voice field and an asynchronous data field, and the ACL packet has a data field only, and the SCO packet has a voice field only. The payload is provided with a payload header. The payload header has information on a payload length.

Figure 4:
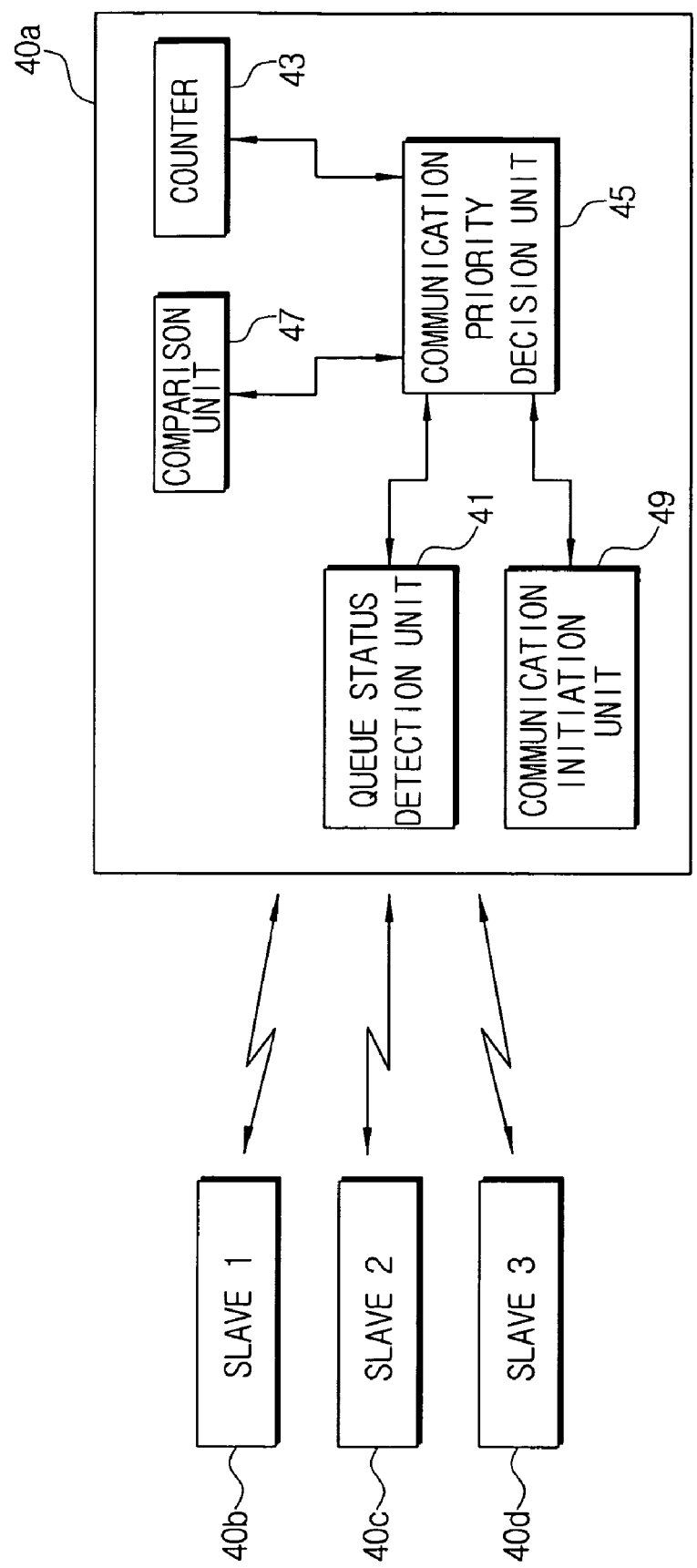
FIG. 4 is a block diagram for schematically showing a wireless communication system according to an embodiment of the present invention.

FIG. 4 is a view for schematically showing a short-range wireless communication system structured in a piconet, according to an embodiment of the present invention. Wireless communication systems 40a, 40b, 40c, and 40d each have a queue status detection unit 41, a counter 43, a communication priority decision unit 45, a comparison unit 47, and a communication initiation unit 49.

The queue status detection unit 41 detects a queue status provided in data based an packets being received and sent from and to the plurality of different wireless communication systems 40b, 40c, and 40d, which operate as slaves. In here, the queue status is exchanged by using a reserved bit of the payload header of a packet. The queue refers to data streams waiting in a buffer for processing, and the queue status information refers to status information on waiting data streams; that is, queue status information can be information on the length of the waiting data.

Figure 5:
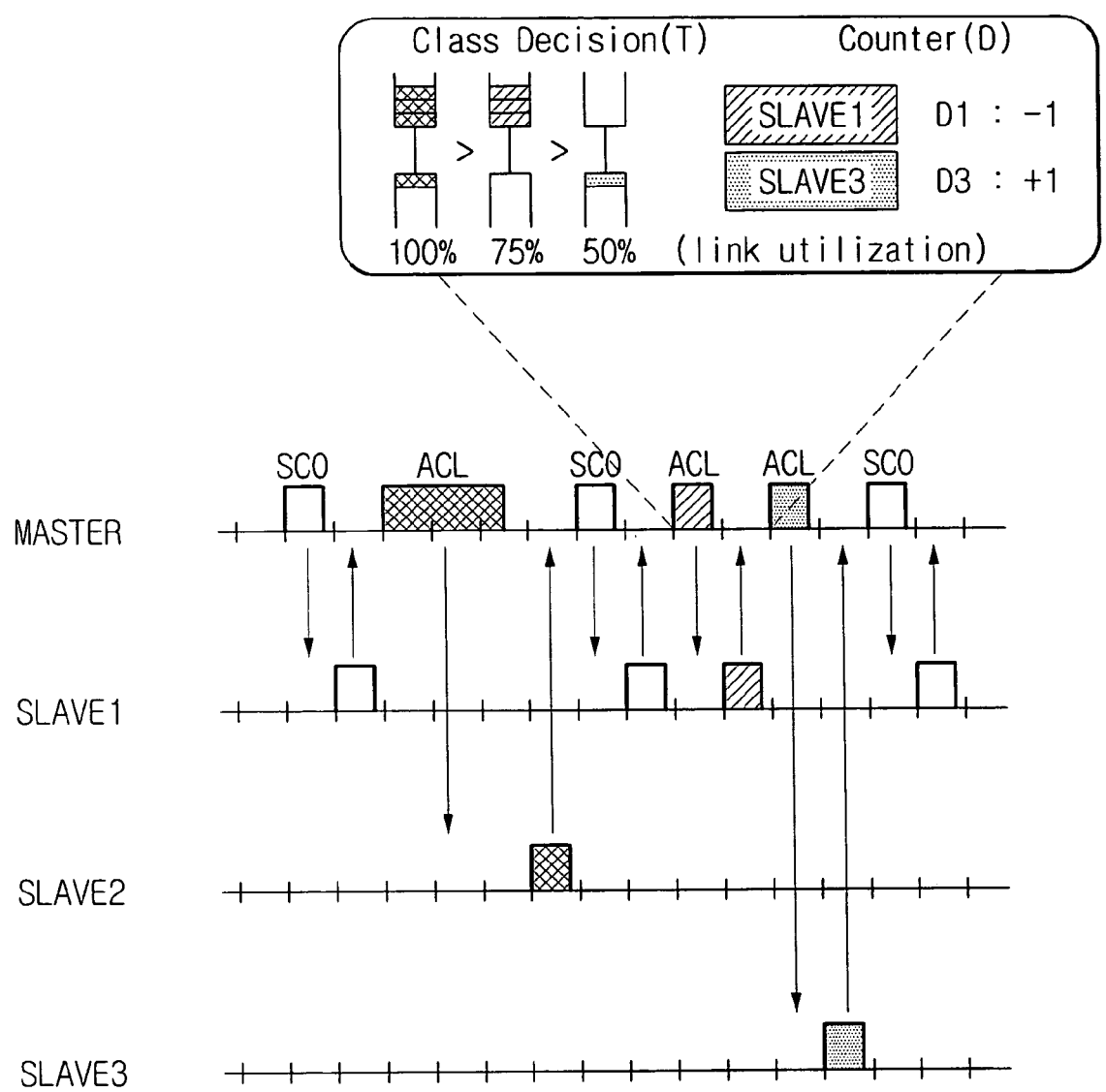
FIG. 5 is a view for explaining a communication method applied to FIG. 4.

The counter 43 counts the numbers of times D1, D2, and D3 that individual maser/slave pairs detected by the queue status detection unit 41, have given away or taken over data transmission opportunities based on the queue status dependent packet scheduling method. For example, the master 40a communicates with the slave 1 40b, slave 2 40c, and slave 3 40d in order, in the round-robin manner. When priorities based on the queue status dependent packet scheduling method are assigned to master 40a/slave 2 40c pair, master 40a and slave 1 40b pair, and master 40a/slave 3 40d in order, as shown in FIG. 5, the master 40a/slave 2 40c pair of class 100% communicates data with each other, and then the master 40a/slave 1 40b pair of class 75% communicates data with each other in the queue status dependent packet scheduling method. At this time, in the round-robin polling manner, the master 40a/slave 2 40c pair communicates data with each other, and then the master 40a/slave 3 40d pair communicates data with each other. However, in this case, if the master 40a communicates data with the slave 1 40b instead of the slave 3 40d, the master 40a/slave 3 40d pair gives away a communication opportunity, and the master 40a/slave 1 40b takes over a communication opportunity. Accordingly, a D3 value of the master 40a/slave 3 40d pair becomes 1, and a D1 value of the master 40a/slave 1 40b pair becomes −1.

The communication priority decision unit 45 decides an order of communication of the respective master 40a/slaves 40b, 40c, and 40d pairs based on the queue statuses of the master 40a/slave 40b, 40c, and 40d pairs detected in the queue status detection unit 41 and the numbers of times D1, D2, and D3 of giving away and taking over communication opportunities. The order of communication is decided according to sizes of priority values P1, P2, and P3 calculated in Formula 1, as shown below.

[Formula 1]

$$P=\alpha T+(1-\alpha D),$$

where a parameter T corresponds to class, for example, 100%, 75%, and 50%, decided based on a queue status of a master/slave pair detected by the queue status detection unit 41, which will be referred to as a "class parameter" hereinafter. A parameter D corresponds to the number of times of the counter 43, for each master/slave pair, has given away communication opportunities, which will be referred to as a "delay parameter". The $\alpha$ is a parameter representing a weighted value for the parameters T and D with respect to a system performance. That is, if the $\alpha$ is small, the order of communication is assigned in further consideration of the performance with respect to delay and fairness.

The comparison unit 47 compares a priority value P of a master/slave pair currently communicating data at the maximum priority value of all the master/slave pairs.

The communication initiation unit 49 initiates communications of the master/slave pairs in the descending order of the priority values P1, P2, and P3 decided by the communication priority decision unit 45.

Figure 6:
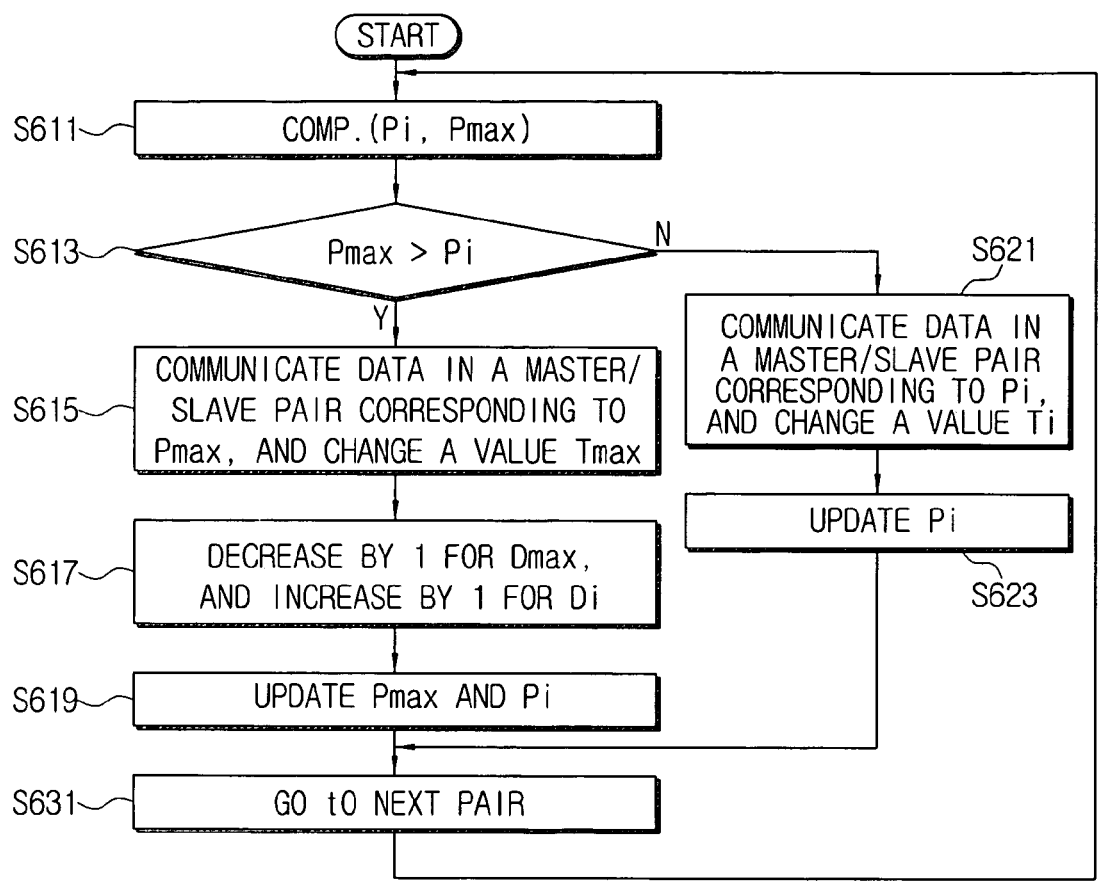
FIG. 6 is a flow chart for showing a wireless communication method according to an embodiment of the present invention.

FIG. 6 is a flow chart for showing a wireless communication method according to an embodiment of the present invention, and FIG. 5 is a view for communicating data in the queue status dependent packet scheduling method. The present invention will be described in detail with reference to the accompanying drawings.

First, the queue status detection unit 41 of the master 40a detects a queue status of each master/slave pair and decides a class. For example, the master 40a detects the number of packets, for example, three packets in FIG. 5, that is to be sent to the slave 1 40b, and, at the same time, requests of the slave 1 40b queue status information on the number of packets, for example, one packet in FIG. 5, that is to be sent to the master 40a. In the above manner, the queue status detection unit 41 detects a queue status of each master/slave pair, and decides parameters T1, T2, and T3 corresponding to the detected queue status. For example, as shown in FIG. 5, classes for master 40a/slave 1 40b, master 40a/slave 2 40c, and master 40a/slave 3 40d pairs become 100%, 75%, and 50% respectively, and the T1, T2, and T3 values are decided, accordingly.

Further, based on the queue status dependent packet scheduling method, the counter 43 counts the numbers of times that communication opportunities have been given away or taken over among the master 40a/slave 1 40b, master 40a/slave 2 40c, and master 40a/slave 3 40d pairs, to decide the delay parameters D1, D2, and D3 for the respective master/slave pairs.

As discussed above, by using the class parameter T in view of the throughput obtained by the queue status detection unit 41 and the counter 43 and the delay parameter D in view of fairness, the priority value P is calculated for the respective master/slave pairs based on Formula 1. That is, the priority values P1, P2, and P3 are calculated for the master 40a/slave 1 40b, master 40a/slave 2 40c, and master 40a/slave 3 40d pairs.

With an exemplary case of P1>P2>P3, where the calculated priority values are P1, P2, and P3, descriptions are made hereinafter on a method for deciding optimum communication priorities, and securing throughput and fairness among master/slave pairs, with reference to FIG. 6.

Each master/slave pair compares the priority values P1, P2, and P3 in the round-robin manner for every slot. For example, if data transmission priority falls on a master 40a/slave 2 40c pair in the round-robin manner, the comparison unit 47 compares a priority value P2 (=Pi) of the master 40a/slave 2 40c pair with a maximum priority value P1 (=Pmax) (S611).

If a priority value P2 of the current master 40a/slave 2 40c pair is smaller than the maximum priority value P1 as a result of the comparison (S613), the communication priority decision unit 45 decides that a master 40a/slave 1 40b pair, which has the maximum priority value P1, has the first opportunity for data transmission.

Therefore, the communication initiation unit 49 enables the master 40a and slave 1 40b to send and receive data with each other, and a queue status of the master 40a/slave 1 40b is changed. Accordingly, the queue status detection unit 41 changes a class parameter T1 (=Tmax) corresponding to the changed queue status of the master 40a/slave 1 40b pair (S615).

Further, the counter 43 decreases by 1 a value D1 (=Dmax) of the number of giving-away times of the master 40a/slave 1 40b pair initiating data communications with the maximum priority value P1, and increases by 1 a value D2 (=Di) of the number of giving-away times of the master 40a/slave 2 40c pair giving away the data communication opportunity (S617).

Next, the communication priority decision unit 45 updates the priority value P1 (=Pmax) by using the decreased D1 and changed T1 of the master 40a/slave 1 40b pair, and also updates the priority value P2 (=Pi) of the master 40a/slave 2 40c pair by using the increased D2 of the master 40a/slave 2 40c pair (S619).

Meanwhile, if there is a master/slave pair, for example, the master 40a/slave 1 40b pair that has the same priority value as the maximum priority value P1, and it is the master 40a/slave 1 40b pair's turn to communicate, the communication priority decision unit 45 decides that the master 40a/slave 1 40b pair takes the opportunity to communicate, and, accordingly, the communication initiation unit 49 enables the master 40a/slave 1 40b pair to communicate data (S621). Accordingly, the queue status detection unit 41 changes the class parameter T1 (=Ti) corresponding to the changed queue status of the master 40a/slave 1 40b pair, and the communication priority decision unit 45 updates the priority value P1 (=Pi) according to the changed parameter T1 (S623).

Thereafter, the master 40a performs the same operations as above with respect to subsequent packet communications (S631).

A data transmission method securing better throughput and fairness can be obtained by deciding priorities among master/slave pairs with the above process.

In order to verify a proposed method of deciding priorities, computer simulations were carried out with respect to a piconet with one master and five slaves connected. Table 1 below shows data traffic of each master/slave pair.

TABLE 1

| Process | M1 MP | S1 MP | M2 MP | S2 MP | M3 MP | S3 MP | M4 MMPP | S4 MMPP | M5 MMPP | S5 MMPP |
|---|---|---|---|---|---|---|---|---|---|---|
| Arrival rate (Transmission rate) | 0.2 | 0.2 | 0.19 | 0.01 | 0.19 | 0.39/ 0.01 (0.01) | 0.39/ 0.01 (0.01) | 0.39/ 0.01 (0.01) | 0.39/ 0.01 (0.01) | 0.39/ 0.01 (0.01) |

In Table 1, traffic was generated for master/slave pairs 1, 2, and 3 through the poisson process (MP), and traffic was generated for master/slave pairs 4 and 5 through the two-state Markov Modulated Poisson Process (MMPP). Performance was evaluated with respect to throughput and fairness through the simulations, and, in order to evaluate the fairness through the number of substantial service times rather than the number of average polling times, the service was measured through variance between throughputs among master/slave pairs.

Two cases were assumed with respect to a class T. Simulations were carried out with respect to a first case where a weighted value difference was exponentially assigned for classes such as T=16t, 8t, 4t, 2t, and 1, and a second case where a weighted value difference was linearly assigned for classes such as T=5t, 4t, 3t, 2t, and 1.

In these two cases, the changes of the class T according to data traffic generations for the respective master/slave pairs differently affected a priority value P.

Figure 7A:
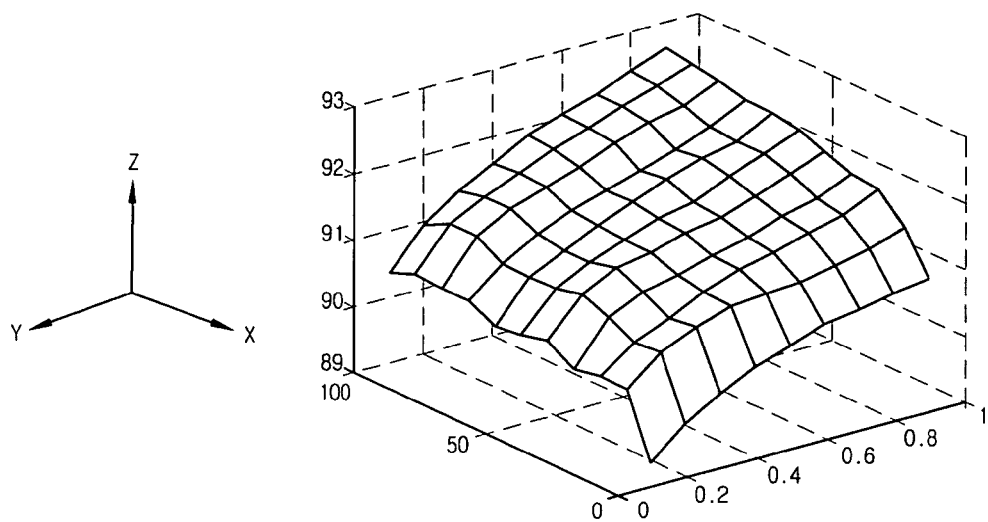
FIG. 7A and FIG. 7B are views for showing simulation results with respect to throughput and variance in case of large class changes.
Figure 7B:
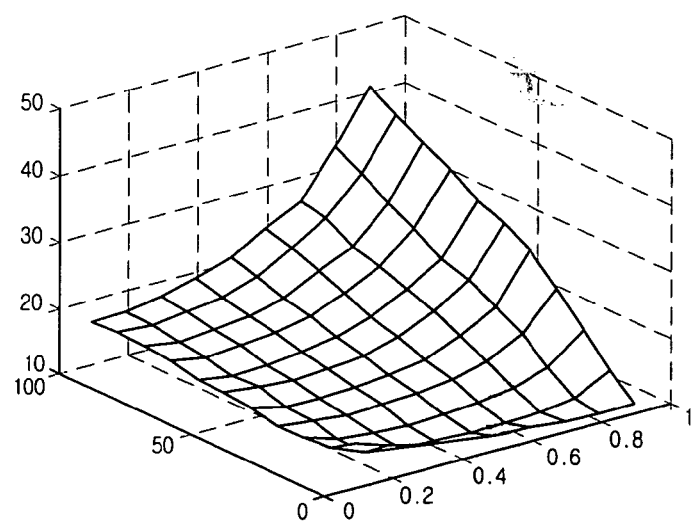

First, FIG. 7A and FIG. 7B show simulation results for the case of exponentially assigning a weighted value difference for classes such as T=16t, 8t, 4t, 2t, and 1, especially, FIG. 7A shows a simulation result for throughput, and FIG. 7B shows a simulation result for variance. In here, the x axis denotes t, the y axis denotes $\alpha$, and the z axis denotes the throughput and variance with respect to FIG. 7A and FIG. 7B. In general, the higher the throughput the better the performance, and the smaller the variance the better the performance.

Referring to FIG. 7A and FIG. 7B, when the classes were exponentially changed, the priority value rapidly responds to queue status changes since the priority value is greatly changed according to the change of link utilization frequency of each master/slave pair, but a delay parameter is not reflected much in a priority decision. Accordingly, when a weighted value difference is exponentially assigned for classes and the changes of the classes become large, the best performance for throughput and fairness is obtained at $\alpha=0.6$ and $t=10$.

Figure 8A:
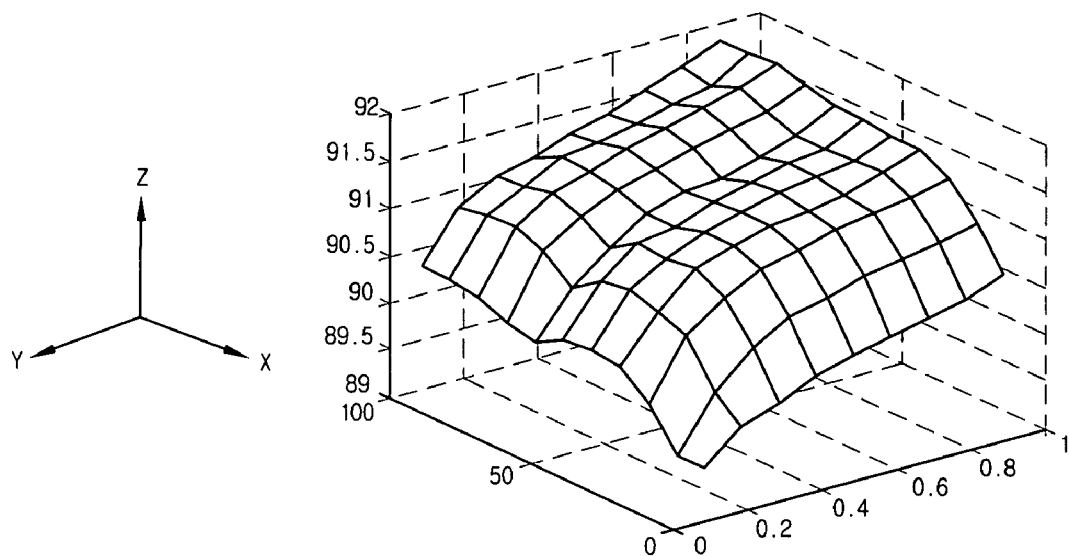
FIG. 8A and FIG. 8B are views for showing simulation results with respect to throughput and variance in case of small class changes.
Figure 8B:
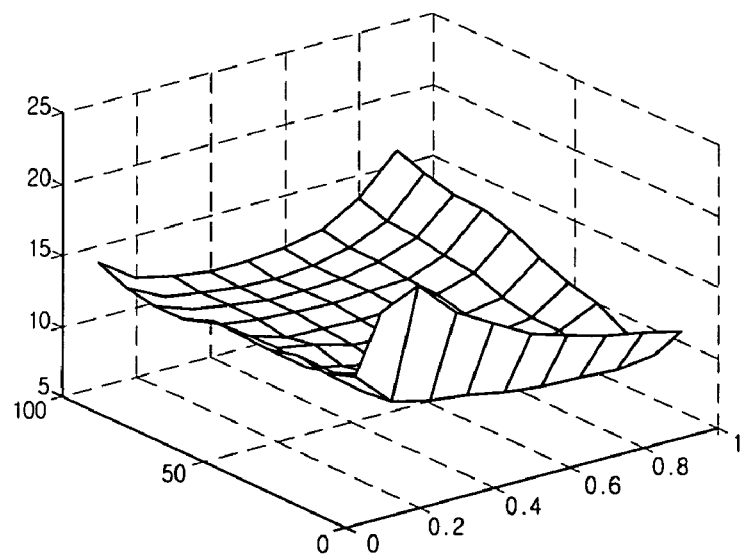

Second, FIG. 8A and FIG. 8B show simulation results when a weighted value difference is linearly assigned for classes such as T=5t, 4t, 3t, 2t, and 1. Referring to FIG. 8A and FIG. 8B, when the classes are linearly changed, the priority value does not respond sensitively to the queue status changes, but a delay parameter may have a relatively large influence on the priority value. Therefore, an optimum performance is obtained at relatively high values of t and $\alpha$ compared to the first case of the exponential difference. That is, the best performance, in the second case, is obtained with respect to throughput and fairness in case of $\alpha$=0.7 and t=20.

Accordingly, the overall performance can be enhanced with an application of a proper a according to characteristics of every application. For example, a relatively small value $\alpha$ is set in case of a long polling interval, and a relatively large value $\alpha$ is set in case of a short polling interval, so that, by matching QoS parameters of a wireless communication system having the same polling interval with parameters of a proposed algorithm, it is possible to control the overall performance of a system.

The present invention, firstly, has an effect of preventing unnecessary transmission rate allocations occurring by uniformly allocating the same transmission rate to every master/slave pair in the round-robin manner. Secondly, the present invention can overcome the complexity of a scheme for restraining the entire performance and securing fairness due to a specific master/slave pair in the queue status dependent scheduling method.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A wireless communication system, comprising:
 a queue status detection unit for detecting an amount of unit data used for communicating among a plurality of external devices, and determining a class parameter T of said one of the plurality of external devices;
 a counter for counting a number of giving-away times of said one of the plurality of external devices based on the giving-away of communication opportunities to communicate with the plurality of external devices, and determining a delay parameter D of said one of the plurality of external devices;
 a communication priority decision unit for calculating priority values P of said one of the plurality of external devices by using the class parameter and the delay parameter, and determining which of the plurality of external devices has priority, based on the priority values; and
 a communication initiation unit for initiating data communications with the determined external device having the priority.

2. The wireless communication system as claimed in claim 1, wherein the communication priority decision unit calculates the priority values based on a Formula, as follows:

$$P=\alpha T+(1-\alpha)D$$

where $\alpha$ denotes a weighted value, T denotes a class parameter, and D denotes a delay parameter.

3. The wireless communication system as claimed in claim 1, further comprising a comparison unit for comparing a maximum priority value with a priority value of a first external device and the priority values of the plurality of external devices, wherein, when the priority value of the first external device is smaller than the maximum priority value, the communication priority decision unit determines that a second external device has the maximum priority value and an opportunity for transmission, and the communication initiation unit initiates communication with the second external device.

4. The wireless communication system as claimed in claim 3, wherein, when initiating communications with the second external device, the queue status detection unit detects an amount of unit data being sent to/from the second external device, and changes a class parameter of the second external device, and the counter decreases the number of giving-away times of the second external device and increases the number of giving-away times of the first external device so as to change delay parameters of the first and second external devices.

5. The wireless communication system as claimed in claim 3, wherein the communication priority decision unit updates the priority values of the first and second external devices by using the changed class parameter and delay parameters.

6. The wireless communication system as claimed in claim 3, wherein, if the priority value of the first external device equals the maximum priority value, the communication priority decision unit determines that the first external device has an opportunity for transmission, and the communication initiation unit initiates communications with the first external device.

7. The wireless communication system as claimed in claim 6, wherein, when initiating communications with the first external device, the queue status detection unit detects an amount of unit data being sent to/from the first external device, and changes a class parameter of the first external device.

8. The wireless communication system as claimed in claim 6, wherein the communication priority decision unit updates the priority value of the first external device by using a changed class parameter.

9. A wireless communication method, comprising steps of:
 detecting an amount of unit data used for communicating among a plurality of external devices, and determining a class parameter of one of the plurality of external devices;
 counting the number of giving-away times of said one of the plurality of external devices based on the giving-away of communication opportunities to communicate with at least one other of said plurality of external devices, and determining a delay parameter of said one of the plurality of external devices;
 calculating priority values P of said one of the plurality of external devices by using the class parameter and the delay parameter, and determining whether said one of the plurality of external devices has priority over said at least one other of said plurality of external devices, based on the priority values; and
 initiating data communications with a determined external device that has the higher priority.

10. The wireless communication method as claimed in claim 9, wherein the external device priority decision step calculates the priority values based on Formula as follows:

$$P=\alpha T+(1-\alpha)D$$

where $\alpha$ denotes a weighted value, T denotes a class parameter, and D denotes a delay parameter.

11. The wireless communication method as claimed in claim 9, further comprising comparing a maximum priority value with a priority value of a first external device and the priority values of said at least one other of said plurality of external devices, and when the priority value of the first external device is smaller than the maximum priority value, a second external device is determined to have the maximum priority value and an opportunity for transmission, and communication with the second external device is initiated.

12. The wireless communication method as claimed in claim 11, wherein, when initiating communications with the second external device, the amount of data being transmitted to/from the second external device is detected, the class parameter of the second external device is changed, and the number of giving-away times of the second external device decreases and the number of giving-away times of the first external device increases so as to change delay parameters of the first and second external devices.

13. The wireless communication method as claimed in claim 11, wherein, when it is determined that the second external device has the maximum priority, the priority values of the first and second external devices are updated, by using at least one changed class parameter and at least one delay parameter.

14. The wireless communication method as claimed in claim 11, wherein, if the priority value of the first external device equals the maximum priority value, the first external device is determined to have an opportunity for transmission, and communications with the first external device is initiated.

15. The wireless communication method as claimed in claim 11, wherein, when initiating communications with the first external device, an amount of data being transmitted to/from the first external device is detected, and a class parameter of the first external device is changed.

16. The wireless communication method as claimed in claim 11, wherein the first external device is updated by using a changed class parameter.

* * * * *